(12) United States Patent
Couffignal et al.

(10) Patent No.: US 8,777,509 B2
(45) Date of Patent: Jul. 15, 2014

(54) DEVICE AND METHOD FOR ASSEMBLING TWO SHELL ELEMENTS MADE FROM A COMPOSITE MATERIAL

(71) Applicant: Airbus Operations SAS, Toulouse (FR)

(72) Inventors: Jean-Pierre Couffignal, Blagnac (FR); Guy Mauran, Colomiers (FR); Frederic Vinches, Larra (FR)

(73) Assignee: Airbus Operations S.A.S., Toulouse (FR)

( * ) Notice: Subject to any disclaimer, the term of this patent is extended or adjusted under 35 U.S.C. 154(b) by 0 days.

(21) Appl. No.: 13/724,651

(22) Filed: Dec. 21, 2012

(65) Prior Publication Data

US 2013/0142565 A1 Jun. 6, 2013

Related U.S. Application Data

(63) Continuation of application No. PCT/FR2011/051422, filed on Jun. 21, 2011.

(30) Foreign Application Priority Data

Jun. 24, 2010 (FR) ...................................... 10 55041

(51) Int. Cl.
*F16B 37/00* (2006.01)
(52) U.S. Cl.
USPC . 403/296; 403/8; 403/DIG. 10; 403/DIG. 12; 411/104; 411/389
(58) Field of Classification Search
USPC ........... 403/8, 257, 259, 374.4, 296, DIG. 10, 403/DIG. 12; 411/104, 389; 52/127.12
See application file for complete search history.

(56) References Cited

U.S. PATENT DOCUMENTS

| | | | | | |
|---|---|---|---|---|---|
| 167,118 | A | * | 8/1875 | Pritchett | 403/8 |
| 2,654,923 | A | * | 10/1953 | Johnson | 403/8 |
| 2,747,638 | A | * | 5/1956 | Cederquist | 411/104 |
| 2,815,997 | A | * | 12/1957 | Korb | 52/584.1 |
| 3,192,981 | A | * | 7/1965 | Oliver | 411/176 |
| 3,298,725 | A | * | 1/1967 | Boteler | 403/282 |
| 3,835,525 | A | * | 9/1974 | King, Jr. | 29/412 |
| 3,962,843 | A | * | 6/1976 | King, Jr. | 403/243 |
| 4,068,958 | A | * | 1/1978 | Beckershoff | 403/8 |
| 4,244,661 | A | * | 1/1981 | Dervy | 403/243 |

(Continued)

FOREIGN PATENT DOCUMENTS

DE 29717630 U1 11/1997

OTHER PUBLICATIONS

Administration in Charge of International Research, Written Opinion and International Search Report dated Sep. 27, 2011 for International Application No. PCT/FR2011/051422.

*Primary Examiner* — Joshua Kennedy
(74) *Attorney, Agent, or Firm* — Ingrassia Fisher & Lorenz P.C.

(57) ABSTRACT

A device and method for assembling two structural elements made from a composite material is provided. The device includes two cylindrical flanged receptacles, each pierced by an aperture perpendicular to the axis of the cylinder, and a shaft that can be introduced into said apertures. The device also includes bearing means, which bear on the interior surfaces of the cylindrical receptacles and can maintain tension in the shaft when the shaft extends through the apertures in the two receptacles. The device includes means of placing the shaft under tension.

9 Claims, 3 Drawing Sheets

(56) References Cited

U.S. PATENT DOCUMENTS

| | | | |
|---|---|---|---|
| 4,457,117 A * | 7/1984 | Leiher et al. | 52/238.1 |
| 5,037,258 A * | 8/1991 | Heurteux | 411/104 |
| 5,170,551 A * | 12/1992 | Norberg | 29/523 |
| 5,934,819 A * | 8/1999 | Mangold | 403/408.1 |
| 6,050,033 A * | 4/2000 | Wrightman | 52/93.1 |
| 6,616,390 B1 * | 9/2003 | Feilner | 411/104 |
| 6,663,314 B2 * | 12/2003 | Bequet | 403/408.1 |
| 7,159,288 B2 * | 1/2007 | Van De Loo et al. | 29/238 |
| 7,913,730 B2 * | 3/2011 | Schaffeld | 144/354 |
| 2012/0045273 A1 * | 2/2012 | Burtscher et al. | 403/296 |

* cited by examiner

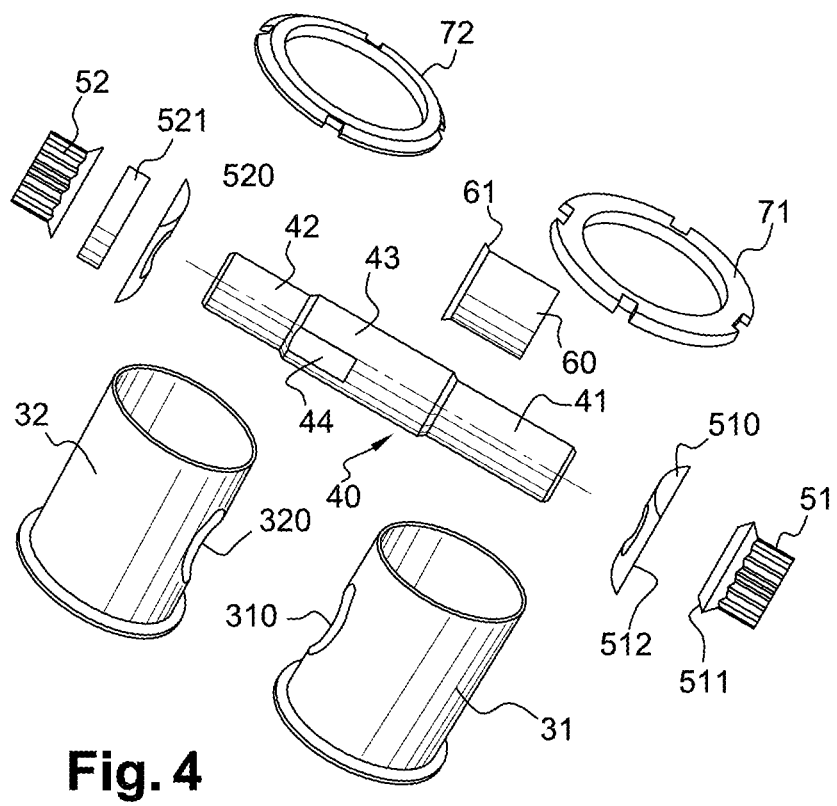
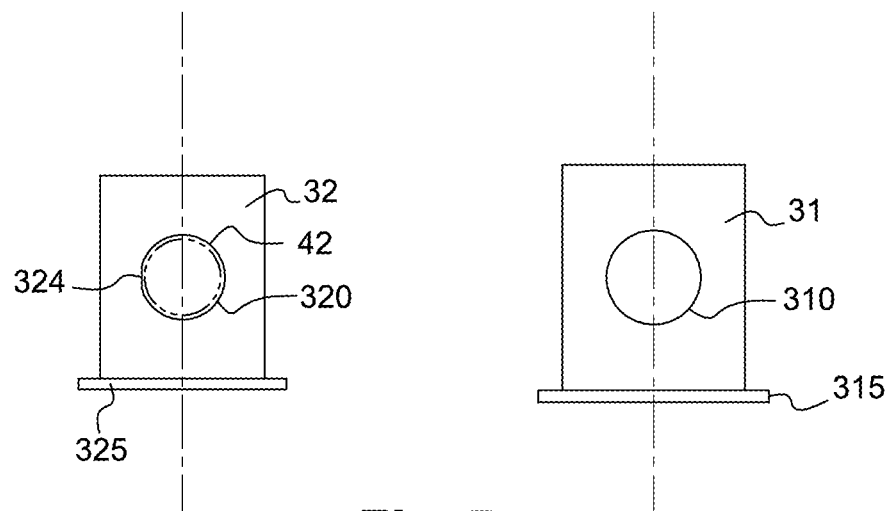

DEVICE AND METHOD FOR ASSEMBLING TWO SHELL ELEMENTS MADE FROM A COMPOSITE MATERIAL

CROSS-REFERENCE TO RELATED APPLICATIONS

This is a continuation of International Application No. PCT/FR2011/051422, filed Jun. 21, 2011, which application claims priority to French Application No. 1055041, filed Jun. 24, 2010, which are hereby incorporated by reference in their entirety.

TECHNICAL FIELD

The technical field relates to the field of assembly methods and devices. More specifically, the technical field relates to the assembly of two shell elements placed side by side along an assembly interface substantially perpendicular to said shell. It finds its application each time such structures are subjected to significant loading perpendicular and/or tangential to the assembly interface, and more specifically when the two shell elements to be assembled are made of a composite material.

BACKGROUND

'Shell element' means a structural part that is relatively thin with regard to its other dimensions, extended along two curvilinear directions whose shape can vary from that of a flat panel to an ellipsoid portion, or more complex shapes with variable double curvature. For example, it can include elements of aircraft wings or fuselages, ship hulls or tanks.

According to the prior state of the art, FIG. 1, the assembly of two shell elements (11, 12) placed side by side is realized with an intermediate part such as a collar (13) or a splice plate. Said collar extends perpendicular to and on both sides of the assembly plane (10). The two shell elements bear on the collar perpendicular to the assembly plane and are fastened to it by means of fasteners (21, 22) extending perpendicular to the contact surfaces between the collar and said shell elements. If the assembly is subjected to traction or compression stresses whose direction is perpendicular to the assembly plane, the force flow corresponding to this stress flows from one element to the other passing by the collar. Thus, this force flow flows from a first shell element (11) to the fasteners (21), subjecting them to shear and burring stresses, then from the fasteners (21) to the collar (13) and from the collar to the second shell element (12), passing again via the fasteners (22). So that this force flow can flow with no risk of damaging the interface structures, especially if the stresses are cyclical, the contact surfaces (101, 102) between the collar and the shell elements must be perfectly adjusted in both shape and perimeter, and the fasteners must be mounted with no play in their housings. These conditions are difficult to comply with in the case of large-sized parts. In particular they entail very tight shape tolerances for the parts present and the counterbored mounting of the fasteners. That is to say that the parts are pre-assembled and that the drilling of holes intended to receive the fasteners is realized simultaneously through the pre-assembled parts held in place. This operating procedure, essential for the resilience of the assembly, is however very penalizing in terms of time. Most often, it requires having access to each side of the shell elements to perform the drilling and fit the fasteners.

In the case in which the elements to be assembled are made of composite materials, such as a laminate of layers of continuous fibers in a resin, the thickness of the elements must be greatly increased in the neighborhood of the assembly plane. In effect, this type of material has only poor resistance to burring. Consequently, when the force flow passing through the assembly is high, it requires the use of fasteners that have a larger diameter, and are therefore more spaced out and cover a greater length, as well as the installation of a greater number of fasteners compared to the assembly of two metal shell elements. This local reinforcement of the shell elements makes them considerably more rigid so that they are even more difficult to adapt in shape and perimeter. In addition, the assembly of elements thus reinforced deviates the force flow from the neutral axis of the shell elements, so that the combination of this force with the end rigidity of the assembled elements gives rise to parasitic bending stresses in the structure resulting from the assembly.

The same argument can be made with regard to the shearing flows, i.e. stresses that act parallel to the assembly plane.

A device is known from the prior state of the art, FIG. 2, in particular from European patent EP1234984 and application US2003205011, both in the name of the applicant, for assembling a composite shell element (13) and a metal shell element (14) assembled by surfaces parallel to the assembly plane by means of traction shafts (23) arranged perpendicular to this assembly plane. Such an assembly allows two shell elements to be connected without utilizing a collar. However this device cannot be transposed to the case of the assembly of two composite shell elements. In effect, in this case the traction shafts must be perfectly adjusted in their housings and over a great length, so as to transmit the shearing flows from one element to the other without risk of damaging their housing by burring. Such a shaft is considered to be adjusted over a great length when its centering length in the part is greater than its diameter, generally 2 times its diameter. In the case of this prior state of the art, this great installation length of the shaft is only present on the composite side. On the metallic side, the burring resistance of the material forming the shell element is much greater, so that the shaft is only centered over a smaller distance, less than or equal to its diameter. In this way the shafts can be pre-positioned on the side of the element made of a composite material before the two elements are butted up, then introduced into the metal element (14) and pulled through it so as to bring the two shell elements closer together, until their assembly surfaces (113, 114) are in contact.

The shaft's short centering length in the metallic portion makes this mounting not very sensitive to slight alignment defects between the holes of two opposite shell elements.

If greater alignment precision is required, the shape of the interface on the metallic side, with its turned out edge (141), allows the pre-assembled elements to be counterbored via the metallic side. However, in the case of a shell element made of a composite material, the turned out edge of the prior state of the art cannot be reproduced without a decline in the mechanical properties of this extremity, which would then work in expansion with respect to the stresses perpendicular to the assembly plane. This mode of stress may be adverse for composite materials. Even if such a shape were realized in composite, the design constraints on the latter's mechanical resilience would deviate the traction shafts from the shell element's neutral axis and would give rise to parasitic moments. If the force flows to be passed through the interface are such that the conditions for burring resistance require a significant contact length between the traction shaft and the hole, it is necessary to have an adjustment tolerance between the diameter of the shaft and the diameter of the hole that can absorb the slight alignment defects between opposite holes of the two shell elements. However this type of mounting, the ability to transmit high cyclical forces, must be realized without play and therefore this type of mounting does not have this adjustment tolerance able to absorb said alignment defects. Given the impossibility of counterboring, the mounting cannot therefore be realized. In addition, other objects, desirable features and characteristics will become apparent from the subsequent summary and detailed description, and the appended claims, taken in conjunction with the accompanying drawings and this background.

SUMMARY

To solve these deficiencies, the present disclosure proposes a device for assembling two structural elements made of a composite material, which comprises two cylindrical flanged receptacles, each pierced by an aperture perpendicular to the axis of the cylinder and a shaft that can be introduced into said apertures. The device also includes bearing means, which bear on the interior surfaces of the cylindrical receptacles and are able to maintain tension in the shaft when the shaft extends through the apertures in the two receptacles. The device further comprises means of placing the shaft under tension.

In this way it is possible to assemble two composite shell elements without realizing a shape with turned out edges at the extremity of one of these elements, the traction shafts being housed on each side in receptacles placed in the holes. This configuration makes it possible to bring the traction shafts closer to the shell element's neutral axis, substantially at the center of its thickness, so as to avoid creating parasitic moments when the interface is subjected to stress. The device concerned by the present disclosure can notably lead to the creation of a structure delimiting a completely closed volume, with the possibility of assembling such structures with access from only one side of said volume during the joining operation. The present disclosure is more specifically suitable for assembling large-sized structures. The present disclosure also provides a device and method designed to assemble two composite shell elements able to transmit a force flow without generating parasitic stresses in the structure.

Advantageously, at least one of the cylindrical receptacles comprises means that can apply and maintain axial tension in the receptacle when it is mounted in a hole. By applying tension in the receptacle the shell element is locally compressed along its thickness. This compression limits the risks of said element's delamination, both under the effect of the force flow passing through the interface when the part thus assembled is in use and also during the assembly operation, when the assembled elements are butted up and tightened, especially if interference adjustment of the traction shafts in their hole is performed.

In order to prevent damaging the holes receiving the traction shafts when said shafts are introduced into them, the traction shaft comprises two threaded extremities separated by a smooth portion with a greater diameter, which can be adjusted in the hole. Thus the threaded portion, with a smaller diameter, is not likely to create scratches in the holes.

When the assembly is realized by a plurality of devices according to the present disclosure, it may be advantageous to absorb the static indeterminacy and slight position and orientation variances of the holes between the two elements by interference fitting. The slight alignment or orientation defects between the traction shafts and the holes in the structural elements are absorbed in the assembly interference tolerances. Interference fitting comprises introducing a male part into a hole with the male part having a larger diameter than the hole. This produces a tight fit without play. In this way, an adjustment tolerance between a male part and a female part can be produced by a higher or lower interference value; this allows alignment defects to be compensated for through this interference tolerance rather than through play.

However composite materials, particularly when they are reinforced by continuous fibers, may not be very suitable for interference assembly since they have a very high elastic limit and a reduced capacity for plastic deformation. To solve this technical problem, the device of the present disclosure comprises a sleeve centered on the smooth portion of the traction shaft. The sleeve in question is made from a material deformable along its thickness; in one example, it is made from a metallic material. It acts as a sacrificial part between the traction shaft and the hole and thus allows alignment and adjustment variances to be compensated for through its deformation, producing a larger tolerance range for an interference fitting. The plastic flow constraint in compression before assembly of the material making up the sleeve is much lower than the static pressure limit of burring resistance for the composite material making up the structural element.

In this way, it is possible to realize interference fits without damaging the composite material around the sleeve, the contact pressure of the sleeve in its hole being limited by said sleeve's plastic flow constraint. The device that is the subject of the present disclosure thus produces an enlarged adjustment tolerance range while providing a mounting without play, therefore making possible a Meccano-type mounting without assembly play, i.e. a mounting where all the holes are drilled in the non-assembled elements.

The present disclosure also relates to a method for the structural assembly of two composite shell elements placed side by side along an assembly interface perpendicular to the shell. The method can comprise individually drilling each shell element with a hole perpendicular to the shell that can receive the receptacle of a device according to the present disclosure and individually, and with the final diameter, drilling the assembly surface of each shell element with a hole that can receive a traction shaft of said device. The method can also include installing the receptacles in each of the shell elements and introducing a traction shaft into each hole of the assembly interface of one of the shell elements. The method can include butting up the other shell element, called receiver, by making the traction shafts penetrate the facing holes and abutting one extremity of each traction shaft against the interior surface of the receptacle. The method can include tightening the assembly by the means of placing under tension of each traction shaft of the device according to the present disclosure.

Thus, if the receptacles' openings are on the same side on the shell elements during assembly, it is not necessary to have access from both sides of the shell elements to achieve this assembly, which may be advantageous if said shell elements, once assembled, delimit a completely closed volume. In one example, the method that is the subject of the present disclosure also comprises introducing a sleeve into the receiver shell element before the butting up step, which makes it possible firstly to prevent damage to said receiver element during butting up, and also to realize a Meccano-type mounting, the slight alignment and adjustment variations being absorbed by the interference tolerance of the shaft in the sleeve.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 4 is an exploded view of parts forming an example of the device according to the present disclosure;

FIG. 5 shows two receptacles viewed from the front; and

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
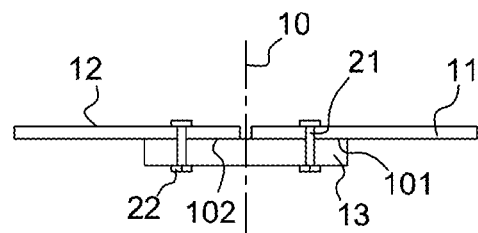
FIG. 1, relative to prior state of the art, shows a schematic cross-section view of two shell elements placed side by side, assembled by means of a collar.
Figure 2:
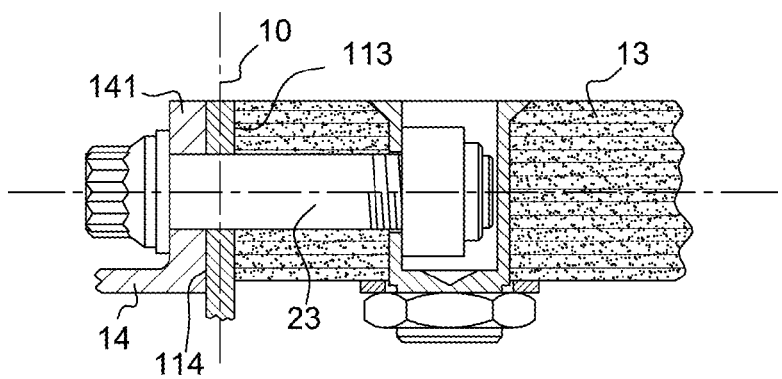
FIG. 2 is a cross-section view of an assembly by traction shafts of a composite shell element and a metallic shell element according to the prior state of the art.
Figure 3:
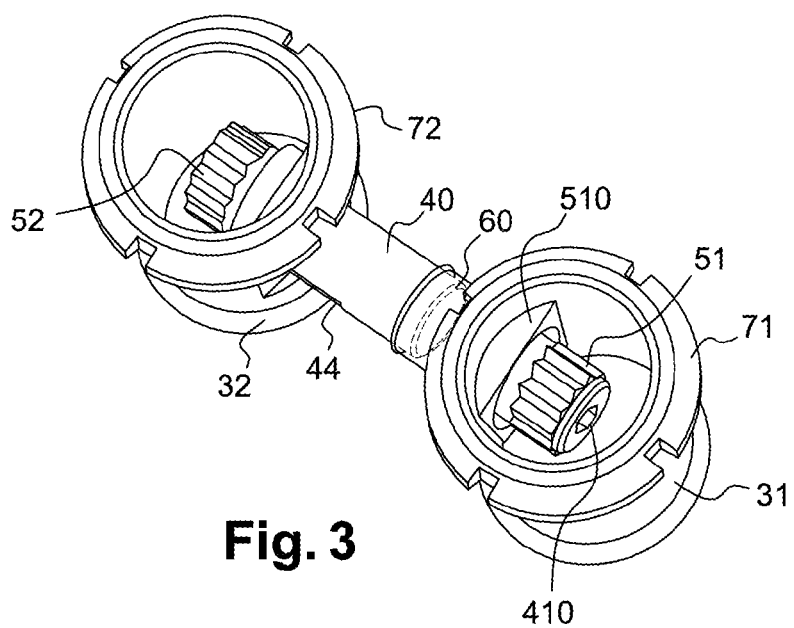
FIG. 3 shows in perspective and in a top view the device that is the subject of the present disclosure.

FIGS. 3 and 4 show, according to an exemplary embodiment of the present disclosure, the device of the present disclosure, which comprises two cylindrical flanged receptacles (31, 32), each pierced by an aperture (310, 320) along an axis perpendicular to the axis of the cylinder. A shaft (40) is housed in these apertures. Said shaft comprises two extremities (41, 42) that have a smaller diameter and are at least partially threaded. Between the two threaded extremities, a smooth portion (43), with a greater diameter and machined with precision, is able to be centered in the holes of the receiver element. The shaft (40) is made from a metallic material suitable for the intended use: steel, in one example, F16PH-type stainless steel, titanium alloy, or an INCONEL®-type nickel-based alloy. It can in one example, be the subject of heat treatments with the aim of increasing the surface hardness.

According to this exemplary embodiment, the two threaded extremities receive nuts (51 and 52). When the device has been installed, said nuts bear on the interior surfaces of the receptacles (31, 32) by means of a washer with a cylindrical surface (510, 520). Generally, the nut placed on the receiver side (51) comprises a spherical bearing surface (511) bearing on a complementary-shaped surface (512) of the bearing washer. At the other extremity, the nut (52) bears on the washer (520) by means of a preloading washer (521). At each of its extremities (41, 42) the shaft comprises an operating mechanism (410, 420) that can receive a key so as to immobilize the shaft in rotation when the nuts are screwed onto the extremities. In this example, the nuts (51, 52) are used to place the shaft (40) under tension and thus tighten the assembly interface. The person skilled in the art will adapt other bearing and tightening means according to the technical field covered by the device that is the subject of the present disclosure. As an example, the nut (51) on the opposite side to the receiver can be a barrel nut, the means designed to place the shaft under tension can be formed from an intermediate eccentric bearing part pivoting along the axis of one of the receptacles and guided on the interior surface of said receptacle.

In order to facilitate screwing the receiver-side nut (51), a flat portion (44) is made on the smooth portion of the shaft, on the opposite side. FIG. 5 shows the aperture (320) of the corresponding receptacle (32) that comprises a flat surface (324) such that said aperture's through diameter remains greater than the diameter of the corresponding threaded extremity (42) of the shaft. Thus, when the flat portion (44) of the shaft's smooth portion is in contact with the flat surface (324) of the aperture of the receptacle (32), the shaft (40) is immobilized in rotation and the receiver-side nut (51) can be screwed in at its extremity and at least partially tightened. During the final tightening, which requires a greater tightening torque, the shaft is immobilized by a key placed in the operating mechanism (410) made for this purpose in the extremity (41) of the shaft so as not to damage the aperture (320).

A sleeve (60), comprising a flange (61), is able to be centered on the smooth portion (43) of the shaft. Depending on the device's technical field of application, this sleeve is made of bronze, a titanium alloy or stainless steel. Alternatively it can be made from a polymer chosen from the family of polyamides or fluorocarbon polymers. The adjustment of the sleeve on the smooth portion will also be chosen according to the application, depending on whether the function of said sleeve is essentially to protect the hole with regard to friction when shafts are introduced into the receiver, the ability to absorb alignment defects in the interference tolerance, or both. During mounting, the sleeve is centered in the hole and penetrates into the aperture (310) of the receiver-side receptacle (31).

The receptacles comprise a threaded portion at the opposite extremity from their flange (325, 315). This threaded portion receives nuts (71, 72), in one example, locknuts locked by a washer with a folding tab washer (not shown). Tightening these nuts makes it possible to apply a compression constraint along the receptacle's axis in the material receiving it and thus reduce the risks of the latter's delamination. In one example, the bottom of the flange-side receptacles (325, 315) is closed. These are made from a metallic material, in one example, corrosion-resistant, since they are likely to retain fluids. As an example, they can be made of a titanium alloy or stainless steel.

Figure 6:
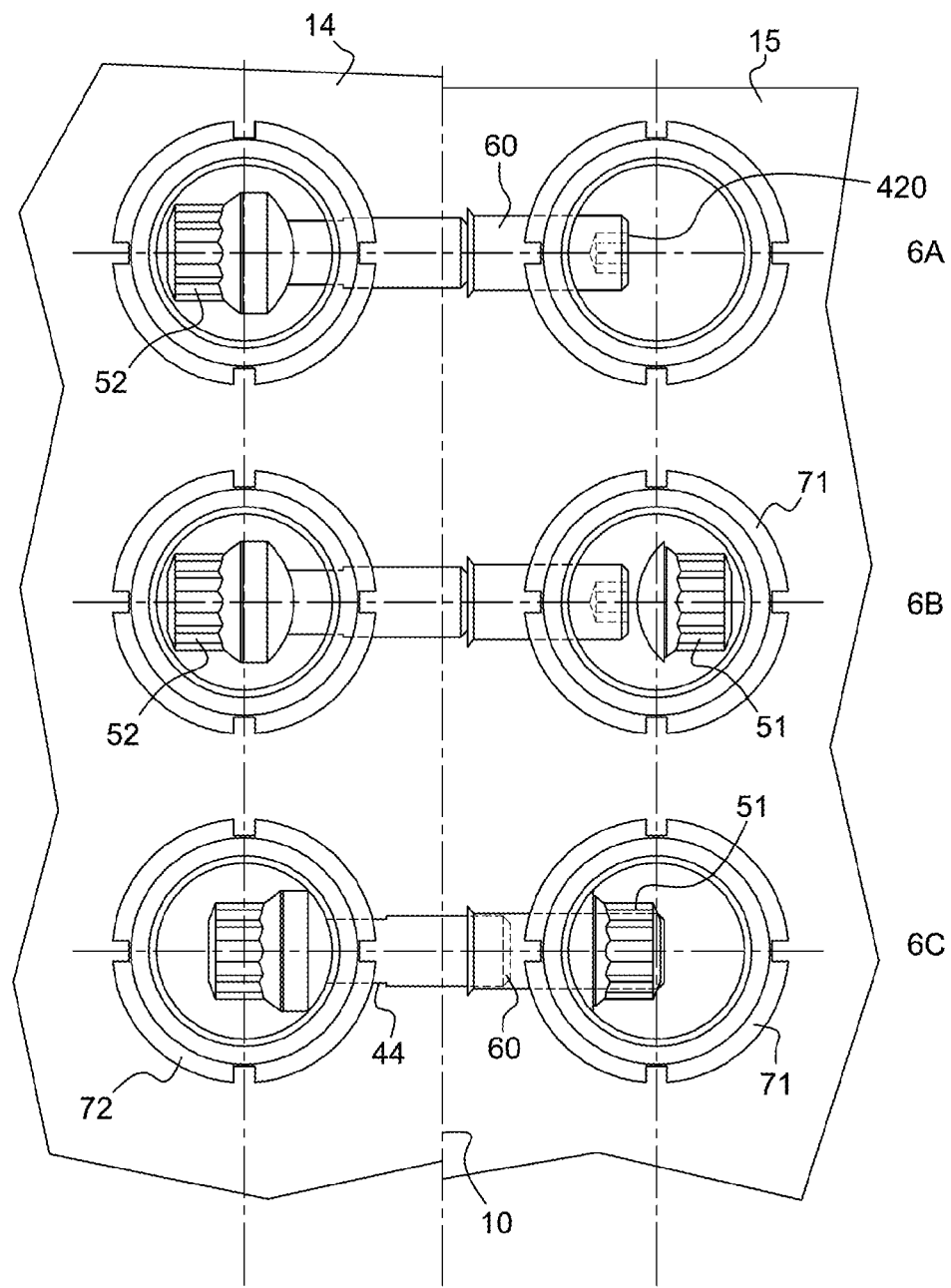
FIG. 6 shows, in the form of a synoptic top view, the method of assembling two composite shell elements according to an example of realization of the present disclosure.

FIG. 6 shows that the present disclosure also relates to an assembly method utilizing one or more devices according to the present disclosure. This method is particularly suited to the assembly of two shell elements (14, 15), made of a composite material with fiber reinforcement in the form of continuous fibers, placed side by side along an assembly plane (10). According to one example, each of the two elements is individually drilled to the final diameter, parallel and perpendicular to the interface plane, with holes that can receive the traction shafts (40) and/or the sleeves (60). This drilling can be performed by portable means aligned by means of drilling templates or on a machining center, depending on the structural element's dimensions and shapes. Depending on the precision sought and the dimensions of said element, this drilling can be carried out after each shell element's interface is measured precisely and the position of the holes are recalibrated according to these measurements, or at the stage of the elementary part.

The transverse holes, parallel to the assembly plane (10) and receiving the receptacles (31, 32), are drilled at the same stage. They can, however, be drilled at the stage of the elementary part if this is easier.

The receptacles (31, 32) are then screwed onto each of the two shell elements (14, 15), a dummy shaft passed through the aperture of the receptacle (320, 310) being used to immobilize it in rotation during this tightening. Advantageously, the receptacles are mounted in their respective holes using a wet mount, i.e. a mastic layer is interposed between the hole and the receptacle.

The traction shafts (40) are then installed on one of the shell elements. To this end, the shaft is slipped into the hole of this element (14) until it passes through the aperture of the receptacle (32), the cylindrical bearing washer (520) and also the preloading washer (521). The nut (52) is then screwed onto the extremity (42) of the shaft, which is immobilized in rotation by means of a key inserted into the operating mechanism (420) on the other extremity. At the same time, the sleeves (60) are introduced into the holes of the receiver element (15). The traction shafts are pushed to the bottom of the receptacles (32) of the first element. In this situation the flat portion (44) is in contact with the flat surface (324) of the receptacle's aperture and immobilizes the shaft (40) in rotation. 6A in FIG. 6 shows the receiver element that is butted up until the assembly surfaces of the two elements come into contact. At this stage, only the shaft's threaded extremity (42) penetrates into the sleeve (60) and the receptacle (32) on the receiver side. Since the latter's diameter is about 2 to about 3 mm less than the diameter of the smooth portion (43) of the shaft, there is sufficient radial play with the sleeve so that no jamming occurs at the level of the shafts (40) during this butting up.

6B in FIG. 6 shows that the cylindrical bearing washer (510) and the spherical seat nut (51) are installed on the extremity (41) of the traction shaft (40) on the receiver element side, the shaft being always pushed to the bottom of the receptacle (32) on the opposite side. The contact between the flat portion (44) and the flat surface (324) of the aperture of the receptacle (32) immobilizes the shaft (40) in rotation, which allows the receiver-side nut (51) to be tightened.

6C in FIG. 6 shows the receiver-side nut tightened, which causes the smooth portion (43) of the traction shaft to penetrate into the sleeve (60). The spherical seat (511) of the receiver-side nut (51) allows this tightening to be carried out without damaging the interior surface of the receptacle (31) even if the shaft is not perfectly oriented along a radius of the cylindrical receptacle (31). The tightening is thus performed step by step and alternately, in one example, starting at the center of the junction and moving towards the exterior. The receptacles can then, if necessary, be closed by caps (not shown). In this way, the assembly is sealed but can also be inspected easily by opening said caps and only accessing one side of the assembly.

The above description clearly illustrates that, through its various features and their advantages, the present disclosure realizes the objectives it set itself. In particular, by proposing an assembly device and method designed to assemble two composite shell elements able to transmit a force flow without generating parasitic stresses in the structure by locating traction shafts at the mid-thickness of the shell elements to be assembled and realizing the assembly of two shell elements placed side by side delimiting, after assembly, a closed volume, by only accessing one side of this volume. The present disclosure also realizes the assembly of two shell elements placed side by side, using a Meccano-type assembly method that does not require counterboring and realizes the assembly of two shell elements placed side by side made of a composite material.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A device for assembling two structural elements made of a composite material, comprising:
    two cylindrical flanged receptacles, each pierced by an aperture substantially perpendicular to the axis of the cylinder;
    a shaft having a first end introducible into the aperture of one of the two cylindrical receptacles, a second end introducible into the aperture of the other of the two cylindrical receptacles and a sleeve centered about the shaft between the first end and the second end, the sleeve having a first end including a flange and a second end opposite the first end, the sleeve positioned about the shaft such that the second end of the sleeve extends into one of the apertures of one of the cylindrical receptacles and the flange is mounted on a central portion of the shaft between the first end and the second end of the shaft;
    bearing means, which bear on the interior surfaces of the cylindrical receptacles and are able to maintain tension in the shaft when the shaft extends through the apertures in the two receptacles; and
    means of placing the shaft under tension,
    wherein at least one of the cylindrical receptacles further comprises means for applying and maintaining axial tension in the receptacle when it is mounted in a hole and the shaft further comprises two threaded extremities separated by a smooth portion with a greater diameter, which can be adjusted in the hole.

2. The device according to claim 1, wherein the plastic flow constraint of the material making up the sleeve is lower than the static pressure limit of burring resistance for the material making up the assembled composite structural element receiving said sleeve.

3. The device according to claim 2, wherein the sleeve is made from a metallic material.

4. The device according to claim 1, wherein the sleeve is centered about a longitudinal axis of the shaft.

5. A method for the structural assembly of two composite shell elements placed side by side along an assembly interface perpendicular to the shell, comprising:
    individually drilling each shell element with a hole perpendicular to the shell that receives a cylindrical receptacle of a device for assembling two structural elements;
    individually, and with the final diameter, drilling the assembly surface of each shell element with a hole that can receive a traction shaft of the device;
    installing the receptacles in each of the shell elements, the receptacles each pierced by an aperture substantially perpendicular to the axis of the cylinder, and at least one of the receptacles includes means for applying and maintaining axial tension in the receptacle when it is mounted in the hole;
    introducing a traction shaft into each hole of the assembly interface of one of the shell elements, the traction shaft having a first end, a second end and defining a first length between the first end and the second end, the first end and the second end of the traction shaft including threads, the threads of the first end and the second end of the traction shaft separated by a smooth portion with a greater diameter than the first end and the second end of the traction shaft;

introducing a sleeve of the device into the receiver shell element, the sleeve of the device centered about the traction shaft between the first end and the second end of the traction shaft, the sleeve having a first end including a flange and a second end opposite the first end, the sleeve defining a second length that is less than the first length;

butting up the other shell element by making the traction shafts penetrate the facing holes;

abutting one of the first end or the second end of each shaft against the interior surface of a receptacle, the sleeve positioned about the traction shaft such that the second end of the sleeve extends into one of the apertures of one of the cylindrical receptacles and the flange is positioned on the smooth portion of the traction shaft; and tightening the assembly by the means of placing under tension of each traction shaft of the device.

6. The method according to claim 5, wherein an aircraft includes the structural assembly.

7. A device for assembling two structural elements made of a composite material, comprising:

two cylindrical flanged receptacles, each pierced by an aperture substantially perpendicular to the axis of the cylinder, and at least one of the cylindrical receptacles includes means for applying and maintaining axial tension in the receptacle when it is mounted in a hole;

a shaft introducible into said apertures, the shaft having a first end, a second end and defining a first length between the first end and the second end, the shaft including a sleeve centered about the shaft between the first end and the second end, the sleeve defining a second length that is less than the first length, the first end and the second end of the shaft including threads, the threads of the first end and the second end of the shaft separated by a smooth portion with a greater diameter than the first end and the second end of the shaft, the sleeve having a first end including a flange and a second end opposite the first end, the sleeve positioned about the shaft such that the second end of the sleeve extends into one of the apertures of one of the cylindrical receptacles and the flange is positioned on the smooth portion of the shaft;

bearing means, which bear on the interior surfaces of the cylindrical receptacles and are able to maintain tension in the shaft when the shaft extends through the apertures in the two receptacles; and means of placing the shaft under tension.

8. The device according to claim 7, wherein the plastic flow constraint of the material making up the sleeve is lower than the static pressure limit of burring resistance for the material making up the assembled composite structural element receiving said sleeve.

9. The device according to claim 8, wherein the sleeve is made from a metallic material.

\* \* \* \* \*